United States Patent
Saito et al.

[11] Patent Number: 6,166,327
[45] Date of Patent: Dec. 26, 2000

[54] WIRING BOX WITH SHIELDED WATER OUTLET

[75] Inventors: Yukitaka Saito; Shinshu Kato, both of Yokkaichi, Japan

[73] Assignee: Sumitomo Wiring Systems, Ltd., Japan

[21] Appl. No.: 09/233,677

[22] Filed: Jan. 19, 1999

[30] Foreign Application Priority Data

Jan. 16, 1998 [JP] Japan .................................. 10-006647
Nov. 16, 1998 [JP] Japan .................................. 10-324947

[51] Int. Cl.⁷ ...................................................... H01J 5/00
[52] U.S. Cl. ...................... 174/50; 174/17 VA; 174/135; 220/374; 285/154.1
[58] Field of Search .......................... 174/48, 50, 17 VA, 174/17 CT, 135, 23 R, 22 R, 77 R; 220/DIG. 6, 374; 285/149.1, 154.1

[56] References Cited

U.S. PATENT DOCUMENTS

| | | | |
|---|---|---|---|
| 2,816,681 | 12/1957 | Taylor | 220/303 |
| 3,072,284 | 1/1963 | Luhman, Jr. | 220/374 |
| 4,216,349 | 8/1980 | Wium | 174/50 |
| 4,467,136 | 8/1984 | Wium | 174/50 |
| 4,609,126 | 9/1986 | Janda | 220/374 |
| 4,871,884 | 10/1989 | Hayashi | 174/52.1 |
| 5,159,155 | 10/1992 | Nishihara . | |
| 5,703,325 | 12/1997 | Yamaguchi et al. . | |

FOREIGN PATENT DOCUMENTS 0236141  9/1987  European Pat. Off. ............. 174/77 R
8275335  10/1996  Japan .

OTHER PUBLICATIONS

Patent Abstracts of Japan, (1 page) 08322124, Mar. 12, 1996.
JP Utility Model Unexamined Publication #63–172215 Nov. 1988.
JP Utility Model Unexamined Publication #63–131519 Aug. 1988.
Patent Abstracts of Japan, (1 Page)08322124, Mar. 12, 1996.

*Primary Examiner*—Kristine Kincaid
*Assistant Examiner*—Dhiru R Patel
*Attorney, Agent, or Firm*—Bierman, Muserlian and Lucas

[57] ABSTRACT

A wire box including a main box having an outer surface with a water outlet therein. A wall is provided around the periphery of the outlet and projects outwardly from the surface in a direction substantially perpendicular thereto. There is a closure on the end of the wall furthest from the main box. There is at least one opening in the wall which communicates between the outlet and the exterior of the box. It is more desirable if there is a protective rib adjacent the opening and spaced apart therefrom a distant sufficient to allow water to run out of the opening. The form of the closure may be widely varied so that there is no direct path into and out of the main box for water to follow.

13 Claims, 7 Drawing Sheets

6,166,327

WIRING BOX WITH SHIELDED WATER OUTLET

This Application claims the benefit of the priorities of Japanese Applications 10-324947, filed Nov. 16, 1998 and 10-6647, filed Jan. 16, 1998.

The present Invention is directed to a wiring box, particularly for use in automobiles, which has provision for preventing water from entering and, at the same time, allowing water within to drain out.

BACKGROUND OF THE INVENTION

Typical wiring boxes of the prior art are shown in FIGS. 18 and 19. Wiring boxes 60 and 65 are used to connect various electrical elements, particularly in a vehicle such as an automobile. Covers 62 are provided on main boxes 61 and 66, respectively, for prevention of water seepage. However, it is recognized that some water will inevitably enter the box and, therefore, wiring box 60 (FIG. 18) has water outlet 63 in its bottom surface. Alternatively, in FIG. 19, wall 68 is provided within main box 61 just within water outlet 67.

However, the foregoing wiring boxes have certain serious deficiencies. Water can enter the boxes through the water outlets, especially when the vehicle is being washed. Moreover, as can be seen in FIG. 19, wall 68 is located inside main box 66. As a result, it reduces the space available and can interfere with and damage the wiring therein.

SUMMARY OF THE INVENTION

It is, therefore, an object of the present Invention to provide improved waterproofing by minimizing the opportunity for water from the outside to enter the box and, at the same time, to prevent internal wires from being damaged.

The present Invention includes a wire box comprising a main box having an outer surface with a water outlet therein. There is a wall adjacent the periphery of the outlet which projects in a direction substantially perpendicular to the surface. On the end of the wall farthest from the main box is a closure which is thereby spaced apart from the main box. At least one opening is provided in the wall which communicates with the outlet and the exterior of the main box.

Protective ribs are located near each of the openings and spaced apart therefrom in a direction parallel to the surface. Advantageously, the ribs can surround the entire wall. Also, a plurality of openings may be provided in the wall, each communicating with the outlet and the exterior of the box. There is a protective rib adjacent each such opening. In a particularly preferred form of the device, there are two openings, diametrically opposite each other and ribs corresponding thereto.

Usefully, the surface is at the bottom of the main box and a section thereof is slanted in the direction of the outlet. This facilitates the draining of water out of the box. Alternatively, a central portion of the closure is raised upward so that it is higher than at least a portion of the perimeter of the closure. Thus, the closure slopes toward the opening(s).

It is of particular value if the height of the rib(s) perpendicular to the surface is greater than the width of the opening in the same direction.

BRIEF DESCRIPTION OF THE DRAWINGS

In the accompanying drawings, constituting a part hereof, and in which like reference characters indicate like parts.

DETAILED DESCRIPTION OF THE INVENTION

Figure 1:
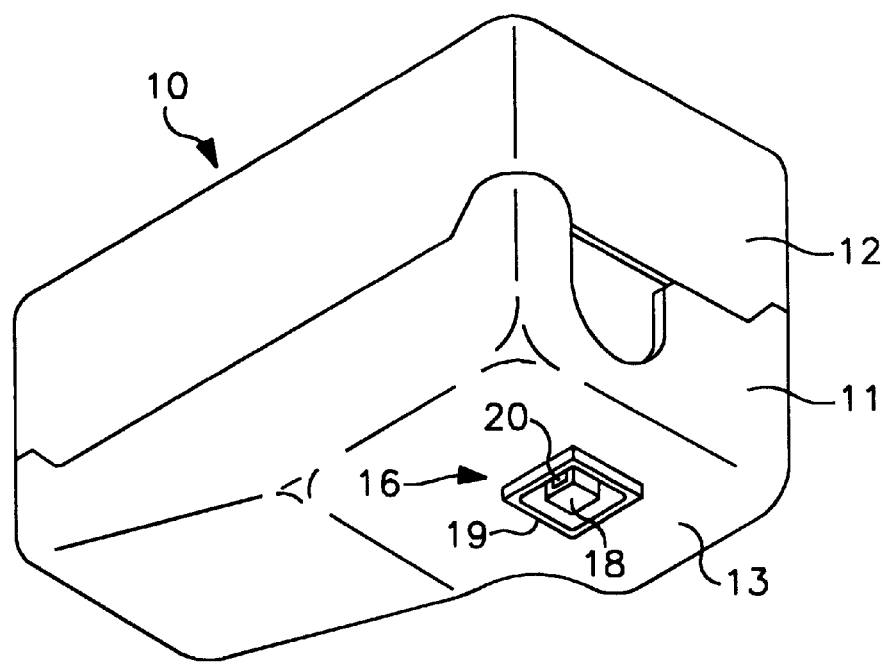
FIG. 1 is a perspective view showing the wiring box from the bottom.

As shown, for example, in FIGS. 1 to 4, wiring box 10 of the present Invention comprises main box 11 and a cover 12. Integral with main box 11 are wall 17 and closure 18 which form a cavity. Wall 17 symmetrically surrounds water outlet 14 and closure 18 is separated by a distance therefrom. A pair of openings 20, communicating between water outlet 14 and the exterior of main box 11, is formed in wall 17. Rib 19, preferably four-sided, projects from outer surface 13 of main box 11. Preferably, height h1 of rib 14 is greater than height h2 of openings 20.

The wiring box in accordance with the present Invention permits water entering main box 11 (such as during a car wash) to drain by passing through water outlet 14 and openings 20. The a protection formed by walls 17 and closure 18 serve to make it very difficult for water below outlet 14 to pass through the outlet and enter main box 11. Moreover, rib 19 impedes water droplets attempting to enter water outlet 14 from below the outlet at an angle thereto.

Figure 2:
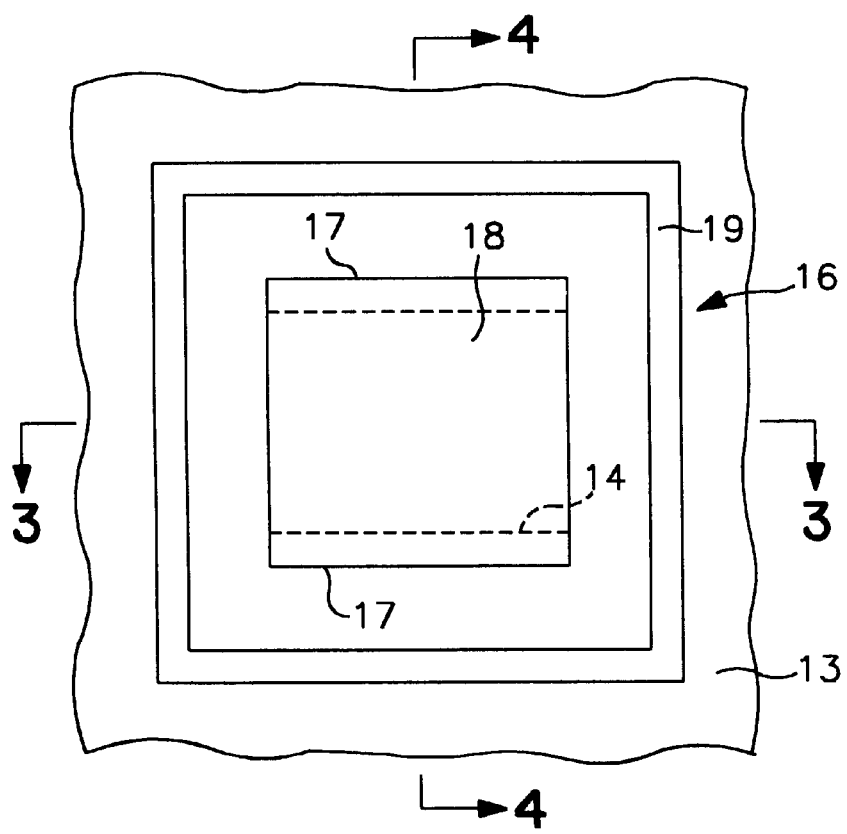
FIG. 2 is an enlarged bottom view of the rib, wall, and closure.
Figure 3:
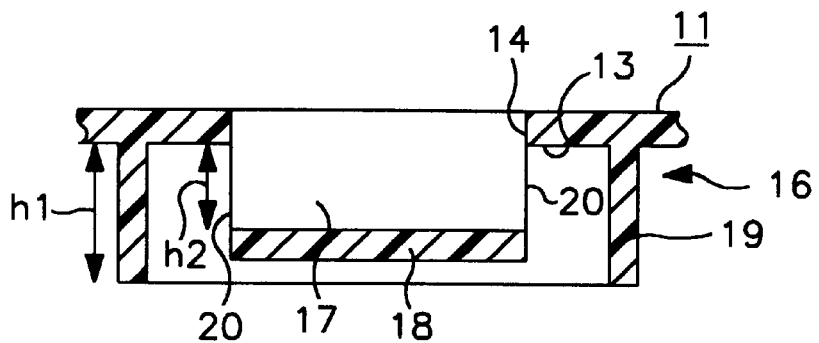
FIG. 3 is a cross section along the line 3—3 of FIG. 2.
Figure 4:
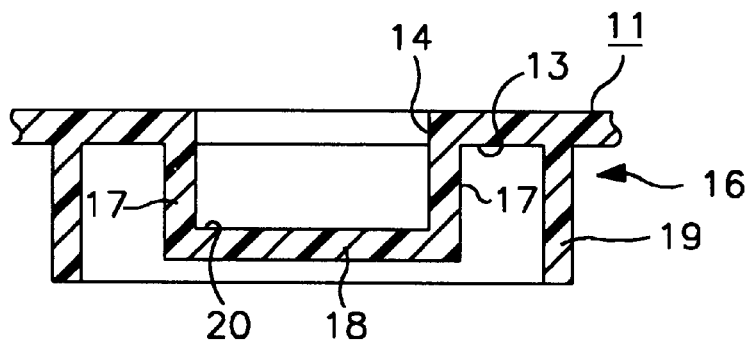
FIG. 4 is a cross section along the line 4—4 of FIG. 2.
Figure 5:
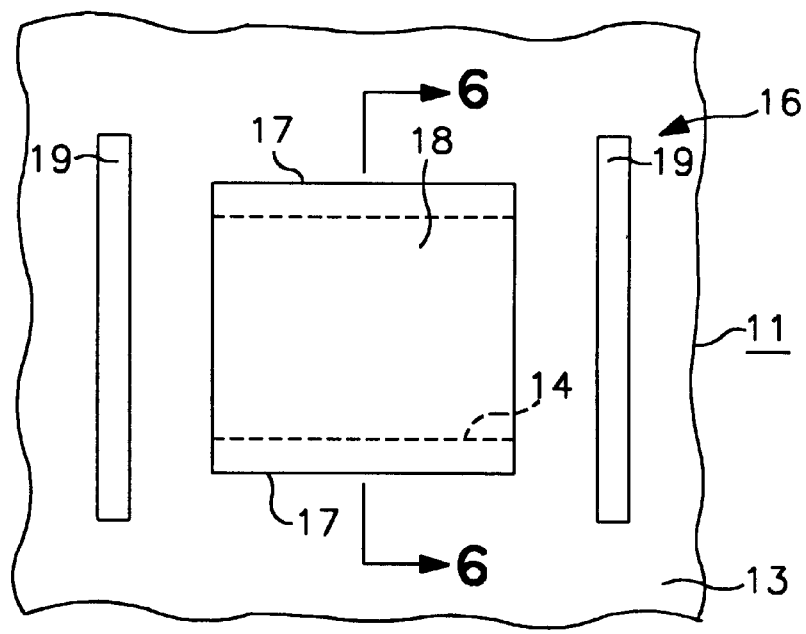
FIG. 5 is a view, similar to that of FIG. 2, of a preferred form of the Invention.
Figure 6:
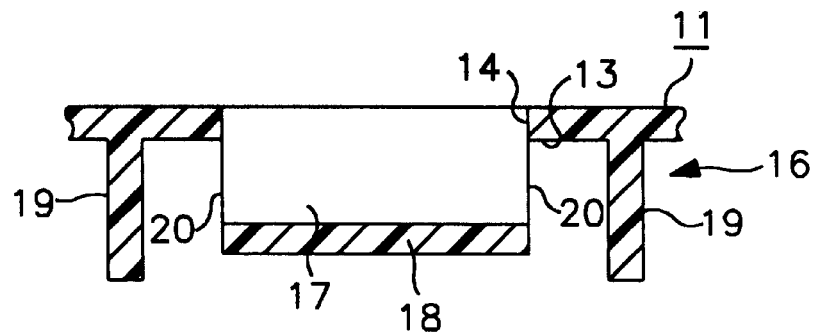
FIG. 6 is a cross section along line 6—6 of FIG. 5.

In FIGS. 5 and 6, water outlet 14 in outer surface 13, wall 17 with openings 20, and closure 18 are all as shown in FIG. 2. Ribs 19 are provided only adjacent openings 20 rather than completely surrounding water outlet 14.

Figure 7:
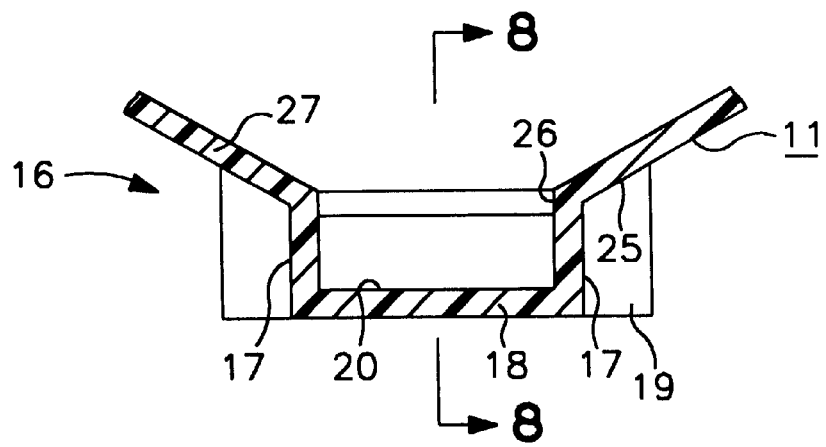
FIG. 7 is a cross section, similar to that of FIG. 6, showing the slanted bottom surface.
Figure 8:
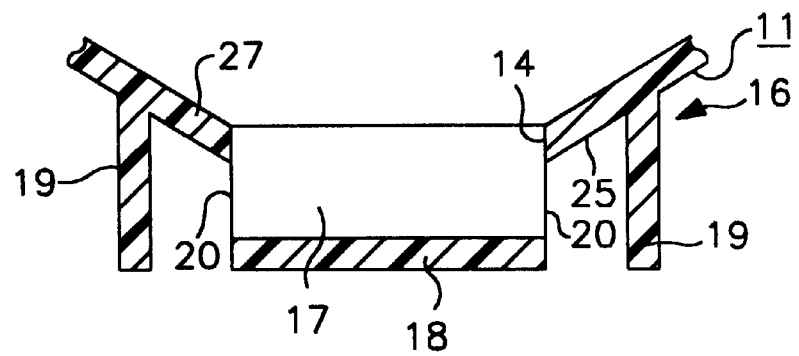
FIG. 8 is a cross section, similar to that of FIG. 4, of the device of FIG. 7.
Figure 9:
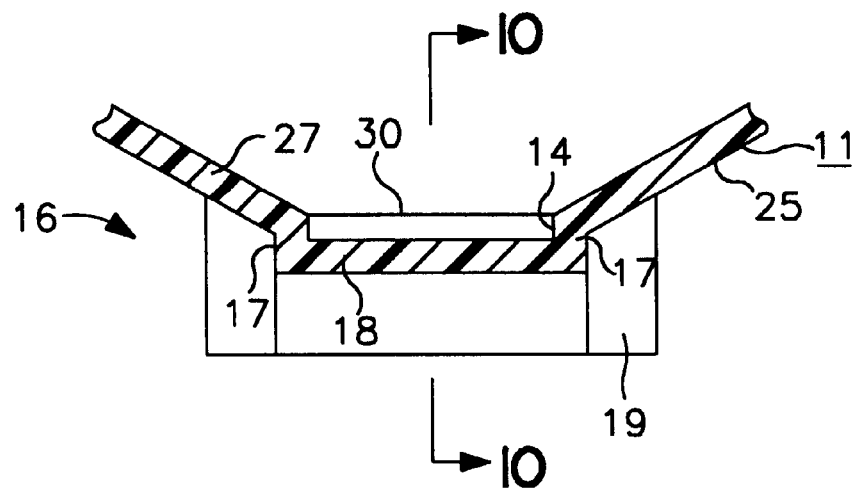
FIG. 9 is a cross section, similar to that of FIG. 8, showing the closure with an elevated central portion.
Figure 10:
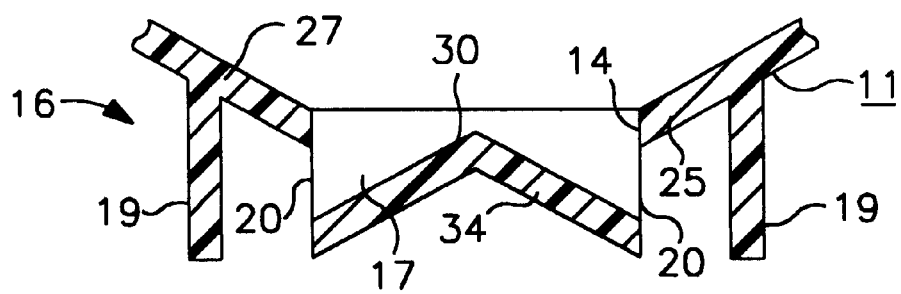
FIG. 10 is a section perpendicular to that of FIG. 9.
Figure 11:
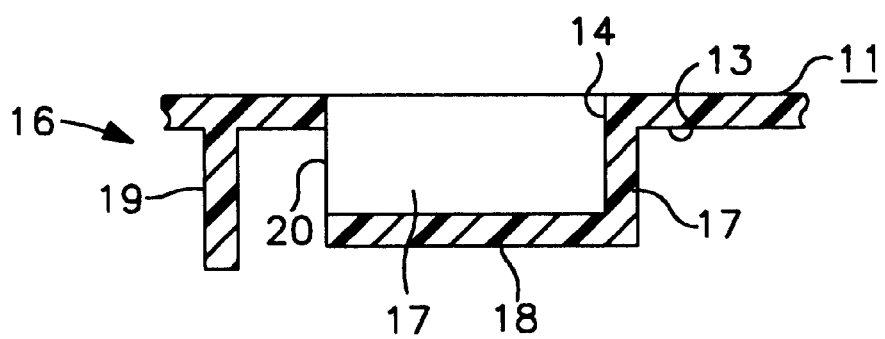
FIG. 11 is a cross section, similar to that of FIG. 2, of a device having only a single opening.

In FIGS. 7 and 8, slanted surface 27 directs any water to water outlet 14 and through openings 20. Closure 18 prevents entry of water from directly below and ribs 19 prevent entry of water at an angle. This configuration permits water to drain out of the box more readily. As shown in FIGS. 9 and 10, closure 18 is designed so that elevated central portion 30 is closer to water outlet 14 than the rest of the closure. This further assists the water to drain out of the box. FIG. 11 shows a box of the present Invention wherein water outlet 14 in outer surface 13 is provided with closure 18. Wall 17 has only a single opening 20 and rib 19 is located adjacent thereto. On the other side of wall 17, there is no opening and rib 19 adjacent thereto may be omitted if desired.

Figure 12:
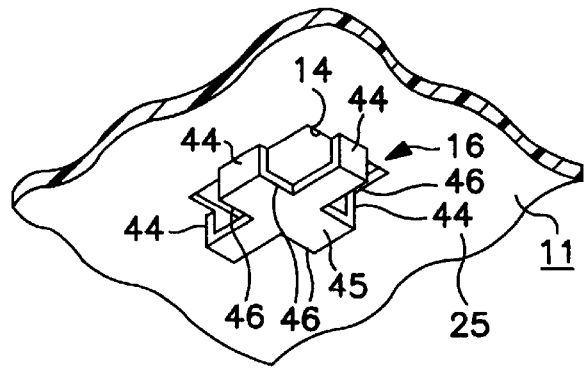
FIG. 12 is a perspective view wherein the closure is cruciform in shape.

As can be best seen in FIG. 12, bottom 25 of main box 11 is provided with shielding member 16 wherein closure 45, affixed to supports 44, is in the shape of a cross. This permits water which has entered main box 11 to pass through water outlet 14 and openings 46, thereby draining main box 11.

Figure 13:
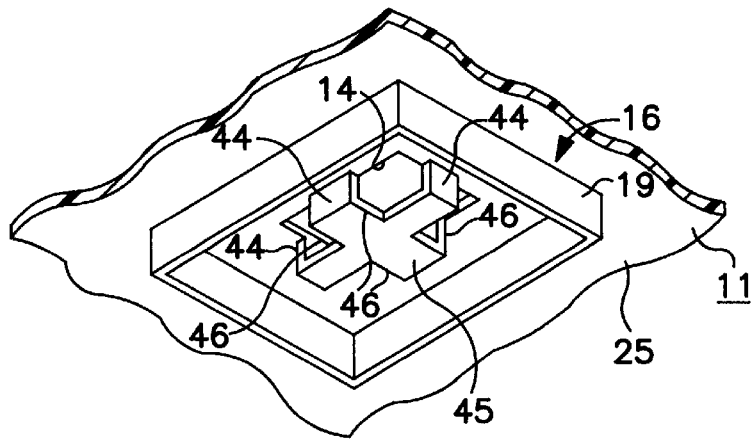
FIG. 13 is a view, similar to that of FIG. 12, wherein the cruciform closure is surrounded by a rib.
Figure 14:
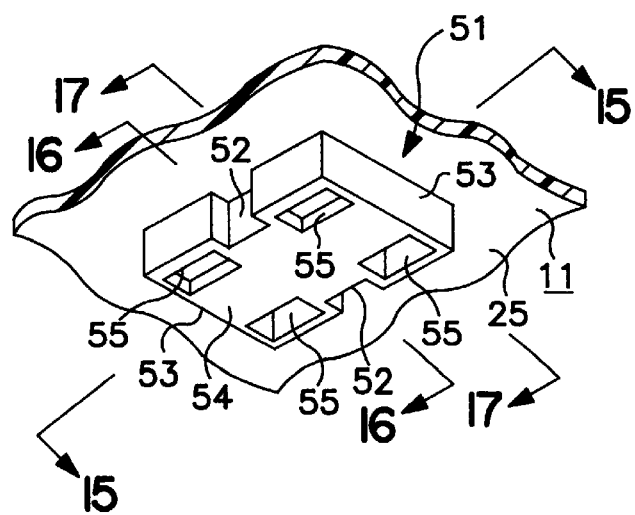
FIG. 14 is a view, similar to that of FIG. 13, wherein the closure has been modified.
Figure 15:
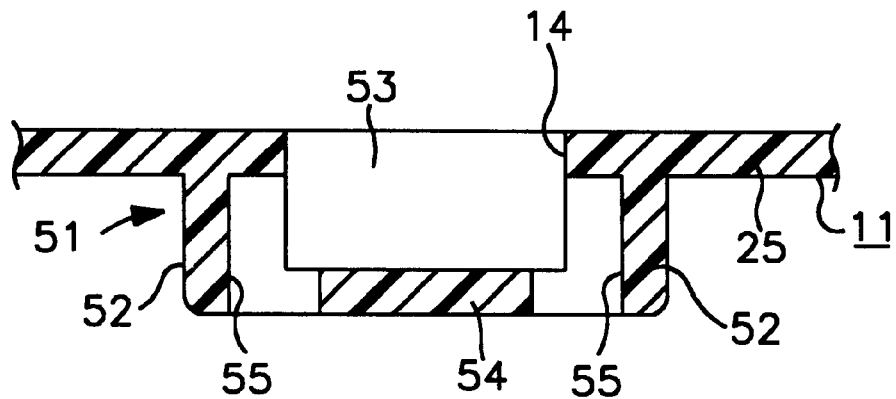
FIG. 15 is a cross section along line 15—15 of FIG. 14.
Figure 16:
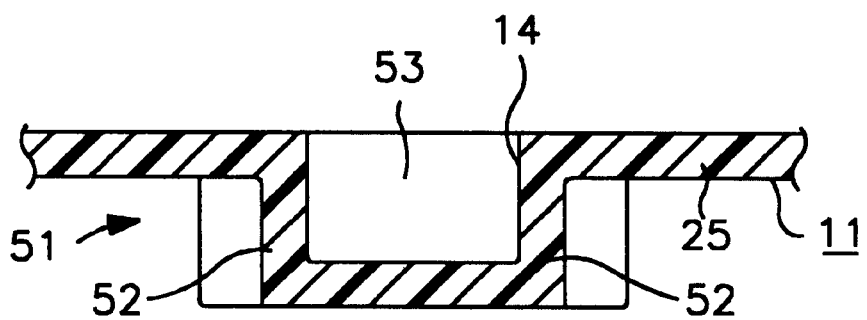
FIG. 16 is a cross section along line 16—16 of FIG. 14.
Figure 17:
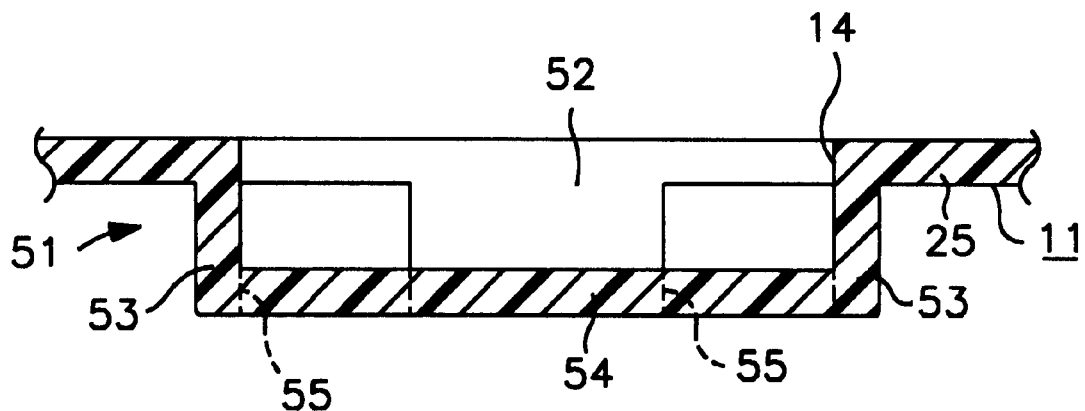
FIG. 17 is a cross section along line 17—17 of FIG. 14.

In a preferred form of the Invention (see FIG. 13), rib 19 surrounds water outlet 14 and is spaced apart therefrom. This provides an added measure of protection against water being splashed into main box 11.

The Invention as shown in FIGS. 14 to 17 includes shielding member 51 which comprises supports 52 and 53, closure 54, and openings 55.

Figure 18:
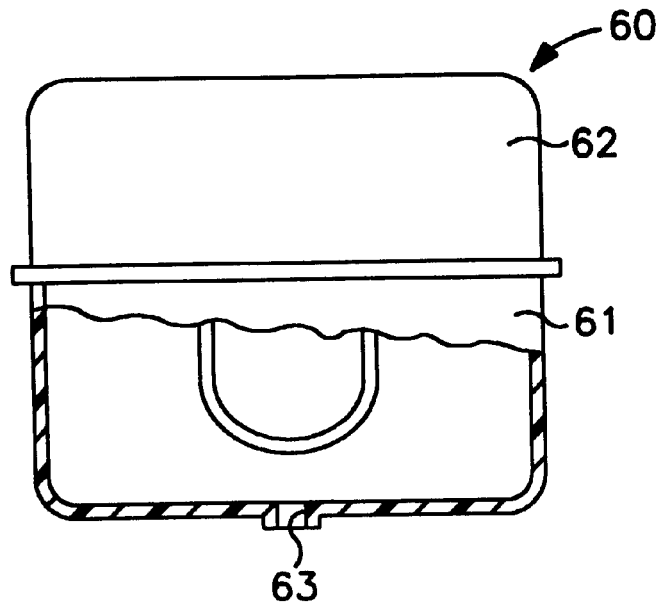
FIG. 18 is a partial section showing a wiring box of the prior art.
Figure 19:
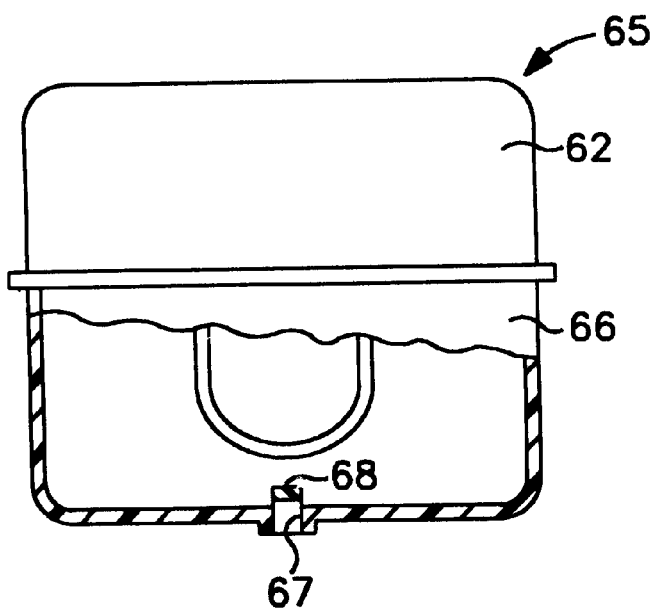
FIG. 19 is a view, similar to that of FIG. 12, of another prior art wiring box.

The present Invention possesses a number of advantages over the prior art wiring boxes as shown in FIGS. 18 and 19. Since closure 18 and wall 17 are disposed outside main box 11, they do not interfere with wires or any other elements within the box. This reduces opportunity for damage during assembly and thereafter. Furthermore, this makes it more difficult for water droplets from directly below to enter the wiring box and hence makes the waterproofing more reliable. If ribs 19 are also provided, this impedes the entry of water even if it comes from below at an angle. If the height of rib 19 is greater than the width of opening 20, it becomes still more difficult for water droplets to enter main box 11. Of course, if only one opening 20 is provided (as in FIG. 11), this increases the reliability of the waterproofing and makes it still more difficult for water to enter the box.

Although a limited number of aspects of the present Invention have been expressly disclosed, such modifications as would be apparent to the person of ordinary skill may be made without departing from the scope or spirit thereof. Although water outlets 14 have been shown as being rectangular, it is within the contemplation of the present Invention that these openings could be of any shape, including circular and triangular. Moreover, the wiring box may be provided with a plurality of shielding members, rather than the single such member specifically described herein. In essence, it is a feature of the present Invention that the openings leading from the water outlet to the exterior of the main box are not directly under the water outlet. In this way, water splashing into the box is either minimized or avoided. It is preferable that the height of the ribs be such that they extend, in a direction perpendicular to the bottom of the box, beyond the openings through which water passes. This adds to the waterproofing ability of the device.

Although only a limited number of aspects of the present Invention have been expressly disclosed, it is, nonetheless, to be broadly construed, and not to be limited except by the character of the claims appended hereto.

What we claim is:

1. A wiring box comprising a main box having an outer surface with a water outlet therein, a shielding member thereon, said shielding member comprising a wall at least partly surrounding a periphery of said outlet and projecting in an external direction from said surface, a closure on an end of said wall remote from said main box, whereby said closure is spaced apart from said main box in said external direction, at least one opening in said wall in communication with said outlet and an exterior of said main box.

2. The wiring box of claim 1 wherein said wall extends around said periphery of said outlet.

3. The wiring box of claim 1 comprising at least one protective rib adjacent said at least one opening and spaced apart therefrom in a direction parallel to said surface.

4. The wiring box of claim 3 wherein said at least one protective rib surrounds said wall.

5. The wiring box of claim 1 wherein said at least one opening comprises a plurality of openings in said wall, each of said openings being in communication with said outlet and said exterior of said main box, a protective rib adjacent each said at least one opening and spaced apart therefrom in a direction parallel to said surface.

6. The wiring box of claim 4 wherein there are two said openings opposite each other.

7. The wiring box of claim 1 wherein said surface is a bottom, a section of said bottom surface being slanted toward said outlet.

8. The wiring box of claim 1 wherein an elevated portion of said closure is closer to said surface than at least a part of a perimeter of said closure, thereby forming a slope toward said at least one opening.

9. The wiring box of claim 3 wherein said at least one protective rib has a first height in said external direction greater than a second height of said at least one opening in said external direction.

10. The wiring box of claim 1 wherein said closure is in the form of a cross, said wall comprising supports, each of which extends from said surface to an end of said cross, whereby said closure, said supports, and said outlet form said at least one opening.

11. The wiring box of claim 10 comprising a protective rib adjacent each said at least one opening and spaced apart therefrom in a direction parallel to said surface.

12. The wiring box of claim 1 wherein said shielding member comprises supports adjacent said outlet, said closure on ends of said supports and covering said water outlet, said closure having a narrow portion between widened portions.

13. The wiring box of claim 1 wherein said wall projects perpendicularly from said surface.

\* \* \* \* \*